June 30, 1931. H. RUMSEY, JR 1,811,866
METHOD OF AND IMPLEMENT FOR CLOSING BAGS
Filed July 21, 1930
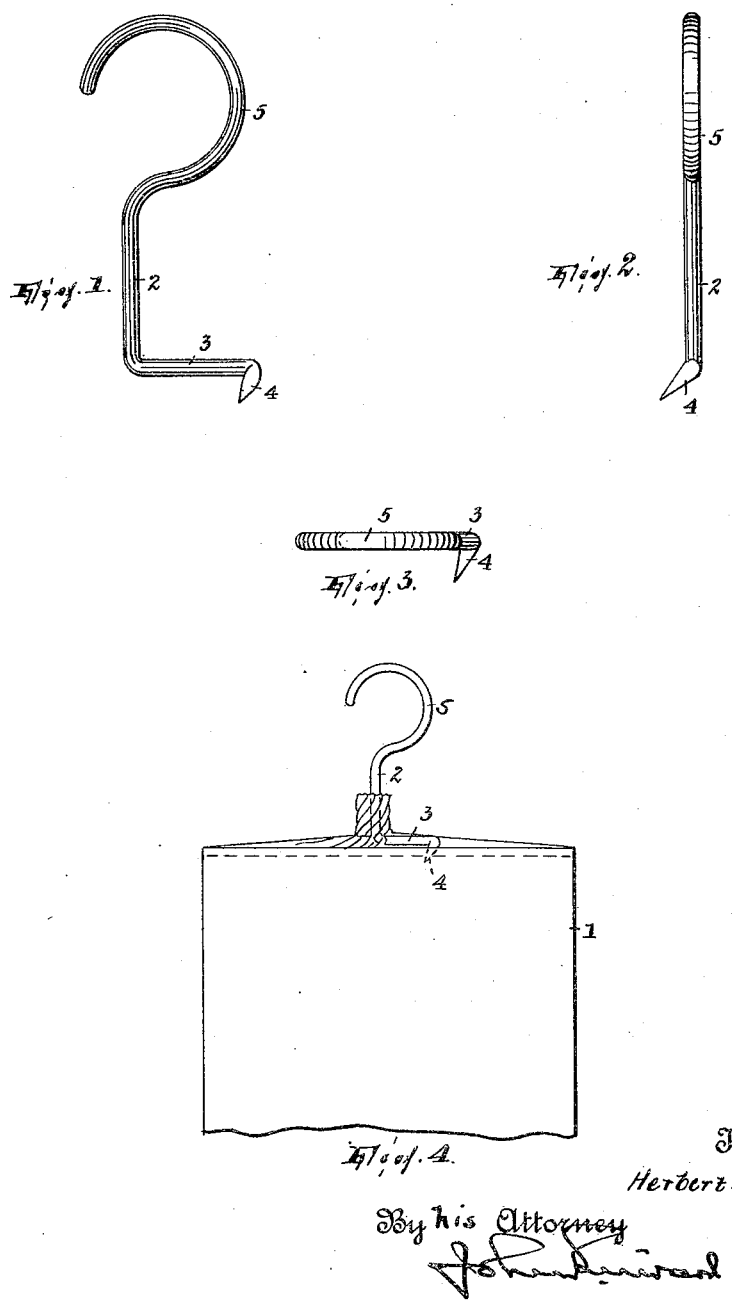
Inventor,
Herbert Rumsey, Jr.,
By his Attorney Patented June 30, 1931

1,811,866

UNITED STATES PATENT OFFICE

HERBERT RUMSEY, JR., OF NUTLEY, NEW JERSEY, ASSIGNOR TO HENRY MUHS COMPANY, OF PASSAIC, NEW JERSEY, A CORPORATION OF NEW JERSEY

METHOD OF AND IMPLEMENT FOR CLOSING BAGS

Application filed July 21, 1930. Serial No. 469,613.

This invention relates to the art of packing material of divers kinds in bags or equivalent containers of flexible sheet material, for instance, fabric bags, and the object is to provide for the closing and securing closed of the mouth of such a container in an easily and quickly performed manner and so that the implement for effecting the closing and securing will serve for carrying or suspending the container.

In the drawings,

Fig. 1 is a front elevation of the device;

Fig. 2 a side elevation thereof;

Fig. 3 a plan; and

Fig. 4 shows the device holding the mouth of a bag closed.

Let 1 designate a bag or other container having an open mouth and being of fabric or other flexible sheet material adapted to be punctured and not to tear too freely when the puncturing implement is used as herein set forth to close its mouth.

The said implement is here shown as a strip of stiff metal, as heavy wire, having a shank 2, a hook portion 3 extending in a radial plane therefrom and having a terminal or bent-off hook proper or spur 4, and a loop 5 forming a handle. The hook is here formed by one end portion of the strip and the handle by the other end thereof. The spur is bent off laterally or in a direction transverse of the axis of the shank and preferably in such a way that it also points somewhat away from the handle 5.

The bag 5 being filled the operator causes the portion 3 by means of its spur 4 to puncture the mouth portion of the bag and then rotates the implement relatively to the remainder of the bag, grasping it by the handle, so that as it turns on its shank as an axis and in the direction opposite to that in which the spur is bent off the mouth portion of the bag will be twisted as shown in Fig. 4. When the twisting has been effected to some desired extent the spur is made to puncture the bag from the outside, whereupon it will be anchored therein and the implement will be thus held in the position to which it was turned thus maintaining the mouth portion of the bag twisted and consequently closed. In the foregoing it is assumed that the puncturing in the first instance is done from the outside; it may, however, be done from the inside by first entering the portion 3 into the mouth portion of the bag.

The implement is then obviously useful for carrying or suspending the bag.

Having thus fully described my invention what I claim is:

1. The hereindescribed method of constricting the mouth of a mouthed container of flexible material which consists in puncturing its mouth portion with a twisting implement having a portion to puncture said mouth portion and then turning said implement relatively to the remainder of the container in a direction to twist said mouth portion thereof.

2. The hereindescribed method of constricting the mouth of a mouthed container of flexible material which consists in puncturing its mouth portion with a twisting implement having a portion to puncture said mouth portion, then turning said implement relatively to the remainder of the container in a direction to twist said mouth portion thereof and finally causing said portion of the implement to puncture the container at a point removed from its thus-twisted mouth portion, whereby the implement will retain said mouth portion in its twisted state.

3. An implement for the purpose described consisting of a shank having a handle and offset from the handle lengthwise of and projecting laterally and rigidly from the shank a puncturing portion having its free end bent off transversely of the shank, whereby on puncturing the mouth portion of a container of flexible material by said puncturing portion and then rotating the implement on the axis of the shank oppositely to the direction in which said free end projects and finally puncturing the container from the outside by said free end the mouth portion of said container will be twisted and thus constricted and held constricted.

In testimony whereof I affix my signature.

HERBERT RUMSEY, JR.